US009007003B2

(12) United States Patent
Kim

(10) Patent No.: US 9,007,003 B2
(45) Date of Patent: Apr. 14, 2015

(54) METHOD FOR CONTROLLING AN INVERTER FOR DRIVING A SWING MOTOR

(75) Inventor: Chang Hyun Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 241 days.

(21) Appl. No.: 13/518,190

(22) PCT Filed: Dec. 23, 2010

(86) PCT No.: PCT/KR2010/009247
§ 371 (c)(1),
(2), (4) Date: Sep. 13, 2012

(87) PCT Pub. No.: WO2011/078592
PCT Pub. Date: Jun. 30, 2011

(65) Prior Publication Data
US 2012/0326638 A1 Dec. 27, 2012

(30) Foreign Application Priority Data
Dec. 24, 2009 (KR) .................... 10-2009-0130965

(51) Int. Cl.
*H02P 3/12* (2006.01)
*H02K 7/10* (2006.01)
(Continued)

(52) U.S. Cl.
CPC . *H02P 3/22* (2013.01); *H02M 1/32* (2013.01); *H02P 27/06* (2013.01); *H02P 29/021* (2013.01)

(58) Field of Classification Search
CPC ........ H02M 1/32; H02P 29/021; H02P 27/06; H02P 3/22; H02P 3/06
USPC ................................ 318/379, 375; 701/22, 50
See application file for complete search history.

(56) References Cited

U.S. PATENT DOCUMENTS 5,574,352 A * 11/1996 Endo et al. ..................... 318/802
6,531,839 B1 * 3/2003 Shin et al. ...................... 318/371
(Continued)

FOREIGN PATENT DOCUMENTS

CN 1665123 A 9/2005
CN 1923559 A 3/2007
(Continued)

OTHER PUBLICATIONS

Search Report dated Sep. 19, 2011 written in Korean for International Application No. PCT/KR2010/009247, filed Dec. 23, 2010, 3 pages.
(Continued)

*Primary Examiner* — Bentsu Ro
*Assistant Examiner* — Zemenay Truneh
(74) *Attorney, Agent, or Firm* — John D. Veldhuis-Kroeze; Westman, Champlin & Koehler, P.A.

(57) ABSTRACT

The present disclosure relates to a method of controlling an inverter for driving a swing motor, and particularly, maximally generates braking torque of the swing motor upon generation of failure of the inverter by switching on/off a lower-phase switch or an upper-phase switch of the inverter in order to prevent an upper swing body from freely rotating which is generated when a semiconductor switch of the inverter is switched off upon the generation of over-current and over-voltage of the inverter that drives the swing motor, thereby being capable of protecting the inverter, rapidly stopping the upper swing body, and preventing the risk of accidents.

3 Claims, 8 Drawing Sheets

(51) Int. Cl.
 B60L 9/00 (2006.01)
 H02P 3/22 (2006.01)
 H02M 1/32 (2007.01)
 H02P 27/06 (2006.01)
 H02P 29/02 (2006.01)

(56) References Cited

U.S. PATENT DOCUMENTS

| | | | |
|---|---|---|---|
| 2003/0039130 A1* | 2/2003 | Curtiss | 363/37 |
| 2007/0216327 A1 | 9/2007 | Sugita | |
| 2009/0243522 A1* | 10/2009 | Suhama et al. | 318/376 |
| 2010/0076638 A1* | 3/2010 | Kitanaka | 701/22 |

FOREIGN PATENT DOCUMENTS

| | | | | |
|---|---|---|---|---|
| CN | 101039097 A | 9/2007 | | |
| CN | 101297471 A | 10/2008 | | |
| JP | 06-153570 | * 5/1994 | | H02P 5/41 |
| JP | 06-153570 A | 5/1994 | | |
| JP | 08-149868 A | 6/1996 | | |
| JP | 09-294301 A | 11/1997 | | |
| KR | 10-1993-0015276 A | 7/1993 | | |

OTHER PUBLICATIONS

Chinese Office Action (in Chinese—no translation available) dated Apr. 18, 2014 for corresponding Chinese Application No. 201080058558, filed Dec. 23, 2010.

* cited by examiner

METHOD FOR CONTROLLING AN INVERTER FOR DRIVING A SWING MOTOR

This application is a Section 371 National Stage Application of International Application No. PCT/KR2010/009247, filed Dec. 23, 2010 and published, not in English, as WO2011/078592 on Jun. 30, 2011.

FIELD OF THE DISCLOSURE

The present disclosure relates to a method of controlling an inverter for driving a swing motor, and particularly, to a method of controlling an inverter for driving a swing motor, which maximally generates braking torque of the swing motor upon generation of failure of the inverter by switching on/off a lower-phase switch or an upper-phase switch of the inverter in order to prevent an upper swing body from freely rotating which is generated when a semiconductor switch of the inverter is switched off upon generation of over-current and over-voltage of the inverter that drives the swing motor, thereby being capable of protecting the inverter, rapidly stopping the upper swing body, and preventing the risk of accidents.

BACKGROUND OF THE DISCLOSURE

Recently, as oil prices have increased, researches on hybrid-type construction machines having improved fuel efficiency by storing surplus power of an engine in a battery and supplying power to the engine having insufficient power from the battery have been actively conducted.

As such, a system using an engine and an electric motor as a common power resource and including an electric energy storage device is referred to as a hybrid system. For example, the hybrid system includes a hybrid car and a hybrid system for heavy equipment, such as an excavator.

In the meantime, a general excavator system performs an operation of swing or traveling a boom, an arm and a bucket which are final loads by the medium of oil pressure taking an engine as a power resource. Contrary to this, in a hybrid excavator system, two motors and an electricity storage device are additionally installed in a general excavator, so that the overall efficiency of the excavator system may be improved. A main component added to the hybrid excavator system includes a motor, an electricity storage device, an inverter and a converter.

FIG. 1 is a configuration diagram illustrating a general hydraulic excavating apparatus.

As illustrated in FIG. 1, the general hydraulic excavating apparatus includes an engine 110, a hydraulic pump 120, a control valve 130, a boom/arm/bucket cylinder 140, a swing motor 150 and a travelling motor 160.

The hydraulic pump 120 is directly associated with the engine 110, to supply pressurized oil to the control valve 130. That is, the hydraulic pump 120 rotates the hydraulic pump with rotation force of the engine 110 and supplies the pressurized oil to the oil pressure main control valve 130.

The control valve 130 may control the pressurized oil to be provided to an actuator (for example, the boom/arm/bucket cylinder 140, the swing motor 150 and the travelling motor 160) by controlling the pressurized oil supplied from the hydraulic pump 120. That is, the control valve 130 drives the excavating apparatus by supplying the pressurized oil to the boom/arm/bucket cylinder 140, the swing motor 150 and the travelling motor 160 according to a lever instruction of a driver.

The boom/arm/bucket cylinder 140 receives the pressurized oil provided from the control valve 130, to drive the boom, the arm and the bucket of the excavating apparatus.

The swing motor 150, which is a hydraulic motor for swing, receives the pressurized oil provided from the control valve 130, to rotate an upper swing body of the excavating apparatus. Further, when the control valve 130 interrupts the supply of the pressurized oil, the swing motor 150 acquires braking force in a stop state.

The travelling motor 160 receives the pressurized oil provided from the control valve 130, to drive a travelling device of the excavating apparatus.

FIG. 2 is a configuration diagram illustrating a general hybrid excavator.

As illustrated in FIG. 2, the general hybrid excavator includes an engine 110, a hydraulic pump 120, a control valve 130, an engine auxiliary motor 210, an engine auxiliary inverter 220, an inverter 230 for swing, a swing motor 240 including a brake, an energy storage unit 250, a hybrid controller 260 and a direct current (DC)/DC converter 270. Here, the hybrid controller 260 is connected with a current detector 261 for detecting a current between the energy storage unit 250 and the DC/DC converter 270. Further, the hybrid controller 260 is connected with a voltage detector 262 for detecting a voltage between the energy storage unit 250 and the DC/DC converter 270.

The general hybrid excavator may obtain driving force by the oil pressure through the engine 110, the engine auxiliary motor 210 directly connected with the engine 110, the hydraulic pump 120 directly connected with the engine auxiliary motor 210, the control valve 130 for controlling the pressurized oil of the hydraulic pump 120 and an actuator for driving the boom, the arm and the bucket.

The engine auxiliary motor 210 directly connected with the engine 110 is operated as a motor when output of the engine 110 is insufficient. However, when the output of the engine 110 is sufficient, the engine auxiliary motor 210 directly connected with the engine 11 is operated as a generator.

The engine auxiliary inverter 220 operates the engine auxiliary motor 210 as the motor or the generator. The engine auxiliary inverter 220 drives the motor under control of the hybrid controller 260.

An input terminal of the engine auxiliary inverter 220 includes a DC link capacitor 221 that is a predetermined capacitor. The DC link capacitor 221 stabilizes an input voltage of the engine auxiliary inverter 220, and when the engine auxiliary motor 210 is operated as the generator, the DC link capacitor 221 performs a function of temporarily storing generated energy.

The swing motor 240 drives the upper swing body of the hybrid excavator. Here, the inverter 230 for swing which drives the swing motor 240 is connected to the DC link capacitor 221 that is a DC voltage terminal.

The inverter 230 for swing, which drives the swing motor 240, performs an acceleration driving and a deceleration driving according to lever control by a user operating the hybrid excavator. The inverter 230 for swing makes the swing motor 240 be operated as a motor at the time of the acceleration. However, the inverter 230 for swing makes the swing motor 240 to be operated as a motor at the time of the deceleration. That is, the inverter 230 for swing converts rotational inertia energy of the upper swing body of the hybrid excavator to electric energy, to supply the converted electric energy into the DC link capacitor 221 of the DC voltage terminal.

The energy storage unit 250 performs a function of storing electric energy and is connected to the DC/DC converter 270 which controls charging and discharging. The DC/DC converter 270 makes a control such that the voltage of the DC link capacitor 221 that is the DC voltage terminal is constant.

The hybrid controller 260 controls the engine auxiliary inverter 220, the inverter 230 for swing and the DC/DC converter 270. The hybrid controller 260 determines an output quantity when the engine auxiliary motor 210 is operated as the motor and an output quantity when the engine auxiliary motor 210 is operated as the generator by controlling a flow of the entire power of the hybrid excavator. Further, the hybrid controller 260 makes a control such that a quantity of electric energy stored in the energy storage unit 250 is maintained at a voltage within a predetermined range.

FIG. 3 is a configuration diagram illustrating a hybrid excavator different from that illustrated in FIG. 2.

The different hybrid excavator illustrated in FIG. 3 generally has the same construction as that of the general hybrid excavator illustrated in FIG. 2, but the different hybrid excavator illustrated in FIG. 3 does not include the DC/DC converter between the engine auxiliary inverter 220 and the energy storage unit 250.

Hereinafter, a construction difference will be described by comparing the construction of the general hybrid excavator illustrated in FIG. 2 and the construction of the different hybrid excavator illustrated in FIG. 3.

The input terminal of the engine auxiliary inverter 220 is formed with the DC link capacitor 221 that is a predetermined capacitor and the large capacity energy storage unit 250 in parallel. Here, ripple current by charging and discharging according to the operation of the engine auxiliary inverter 220 is configured to be supplied from or charged in the DC link capacitor 221.

The different hybrid excavator includes the energy storage unit 250 for storing energy. The energy storage unit 250 is configured to charge surplus energy of the engine 110 and discharge energy in the operation of the upper swing body. The hybrid controller 260 determines the output quantity when the engine auxiliary motor 210 is operated as the motor and the output quantity when the engine auxiliary motor 210 is operated as the generator by controlling the flow of the entire power of the hybrid excavator. Further, the hybrid controller 260 makes a control such that a quantity of electric energy stored in the energy storage unit 250 is maintained at a voltage within a predetermined range.

In the meantime, the inverter 230 for swing, which drives the swing motor 240, includes six semiconductor switches, an inverter controller for controlling on/off of the semiconductor switch and a DC-terminal capacitor for stabilizing voltage of the input terminal in order to drive a three-phase motor.

In order to supply current to the swing motor 240, the inverter controller controls voltage applied to the swing motor 240 by adjusting an on/off pulse width of the six switches.

The semiconductor switch device is damaged when over-current is generated or by over-voltage. In order to prevent the damage, the inverter controller of the inverter 230 for swing switches off the six switches in order to protect the inverter 230 for swing upon the occurrence of the over-current and the over-voltage.

When failure such as the over-current and the over-voltage of the inverter 230 for swing is detected during the rotation of the upper swing body, so that the inverter controller switches off the switches, the upper swing body freely rotates until a braking operation by rotational inertia. In this case, there is a problem in that the risk of accidents due to a collision between a neighboring object and the upper swing body is greatly increased.

That is, when an abnormal state, such as the over-current and the over-voltage, of the motor or the inverter driving the motor is generated in the hybrid excavator employing the electric swing motor 240 so as to drive the upper swing body, the inverter for swing in the related art interrupts the power supply of the motor. Then, the upper swing body freely rotates until the braking operation, which has a problem in that the risk of accidents is substantially increased.

In order to solve the problem, a method of controlling an inverter for effectively stopping a motor when failure of an inverter driving a motor is detected has been urgently required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is conceived in order to solve the above problem, and an object of the present disclosure is to provide a method of controlling an inverter for driving a swing motor, which maximally generates braking torque of the swing motor upon generation of failure of the inverter by switching on/off a lower-phase switch or an upper-phase switch of the inverter in order to prevent an upper swing body from freely rotating which is generated when a semiconductor switch of the inverter is switched off upon the generation of over-current and over-voltage of the inverter that drives the swing motor, thereby being capable of protecting the inverter, rapidly stopping the upper swing body, and preventing the risk of accidents.

To this end, disclosed is a method of controlling an inverter for driving a swing motor so as to swing an upper body of a hybrid excavator, the method includes: confirming whether failure caused by over-current and over-voltage is generated in the inverter for driving the swing motor; and when the failure of the inverter for driving the swing motor is confirmed, switching off a switch of the inverter for driving the swing motor, and switching on/off a switch of the inverter for driving the swing motor so as to generate braking torque of the swing motor, and generating the braking torque in the swing motor, to rapidly stop the upper body of the hybrid excavator.

The present disclosure has an effect of preventing the risk of accidents by detecting failure of an inverter caused by over-current or over-voltage, protecting the inverter upon the generation of the failure, and rapidly stopping the upper swing body in the driving of a hybrid excavator to which a swing motor for driving an upper swing body is applied.

DESCRIPTION OF THE DRAWINGS

FIG. 6 is an example diagram illustrating an exemplary embodiment of braking torque when three lower-phase switches of an inverter are switched on.

DETAILED DESCRIPTION

Figure 1:
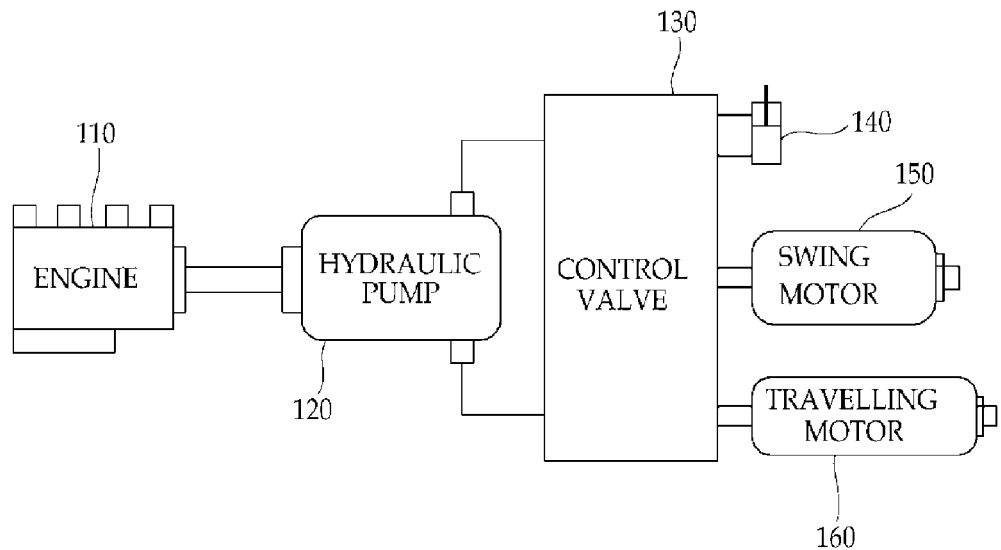
FIG. 1 is a configuration diagram illustrating a general hydraulic excavating apparatus.
Figure 2:
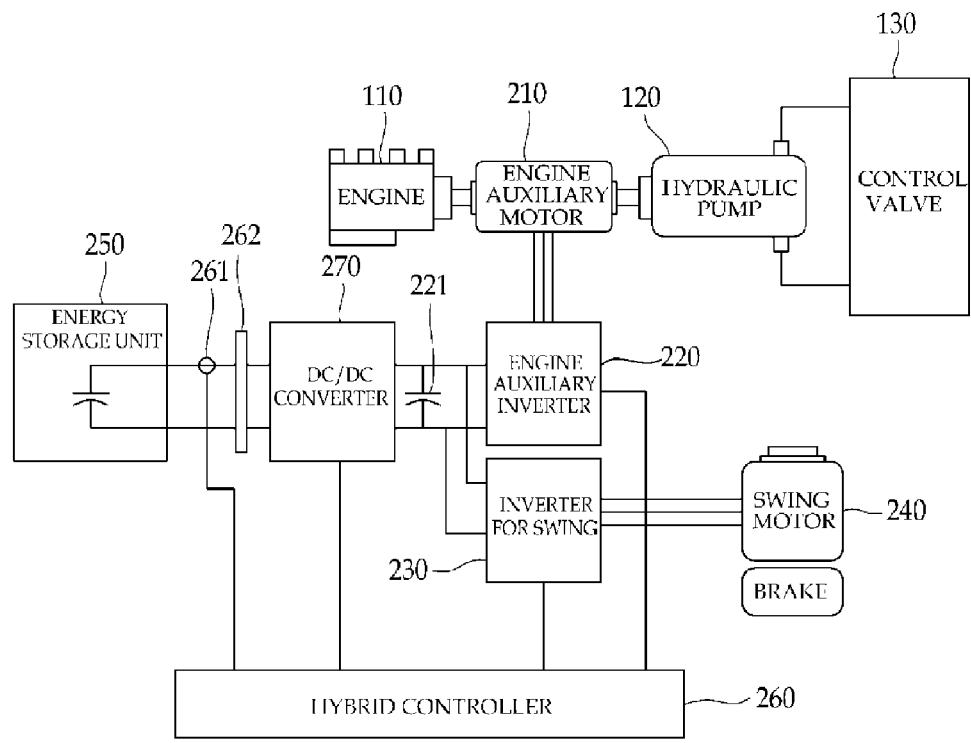
FIG. 2 is a configuration diagram illustrating a general hybrid excavator.
Figure 3:
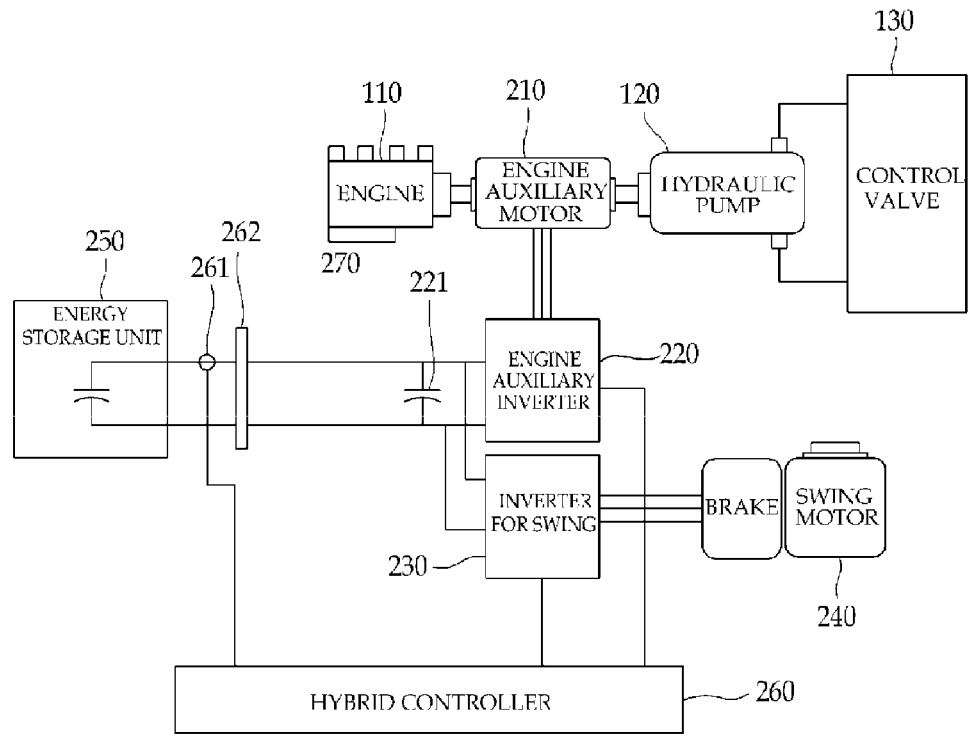
FIG. 3 is a configuration diagram illustrating a hybrid excavator different from that illustrated in FIG. 2.

Hereinafter, exemplary embodiments of the present disclosure will be described in detail with reference to the accompanying drawings. The construction of the present disclosure and the effect thereof will be clearly understood through the detailed description below. Prior to describing the present disclosure in detail, it should be noted that the same components refer to the same reference numerals anywhere as possible in the drawings, and when it is determined that a detailed description relating to well-known functions or configurations may make the subject matter of the present disclosure unnecessarily ambiguous, the detailed description will be omitted.

Figure 4:
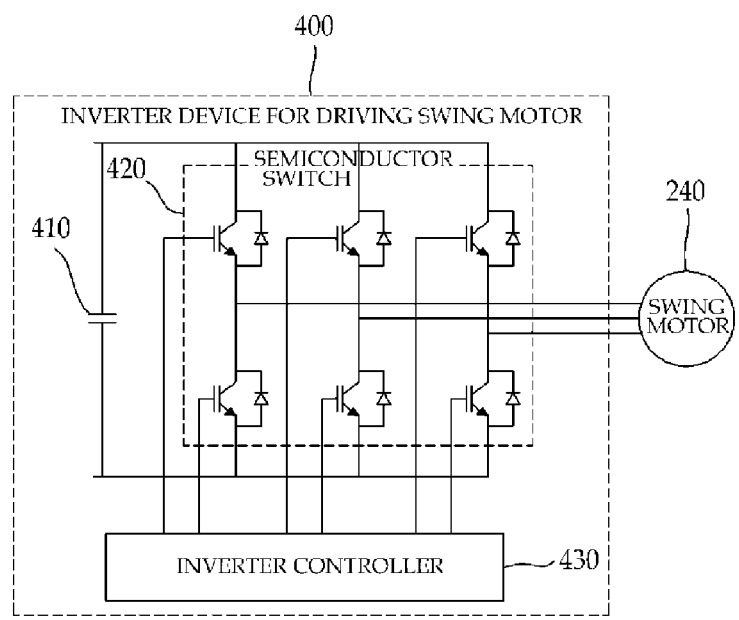
FIG. 4 is a configuration diagram illustrating an exemplary embodiment of an inverter device for driving a swing motor to which the present disclosure is applied.

FIG. 4 is a configuration diagram illustrating an exemplary embodiment of an inverter device for driving a swing motor according to the present disclosure.

As illustrated in FIG. 4, the inverter device 400 for driving the swing motor to which the present disclosure is applied includes a DC terminal capacitor 410, a semiconductor switch 420 and an inverter controller 430. Hereinafter, each constructional element of the inverter device 400 for driving the swing motor will be described.

The semiconductor switch 420 includes six switches SW1 to SW6 (see FIG. 7A) for driving a swing motor 240 that is the three-phase motor. The six switches SW1 to SW6 are divided into upper-phase switches SW1, SW2 and SW3, and lower-phase switches SW4, SW5 and SW6.

The inverter controller 430 controls on/off of the semiconductor switch 420.

Figure 5:
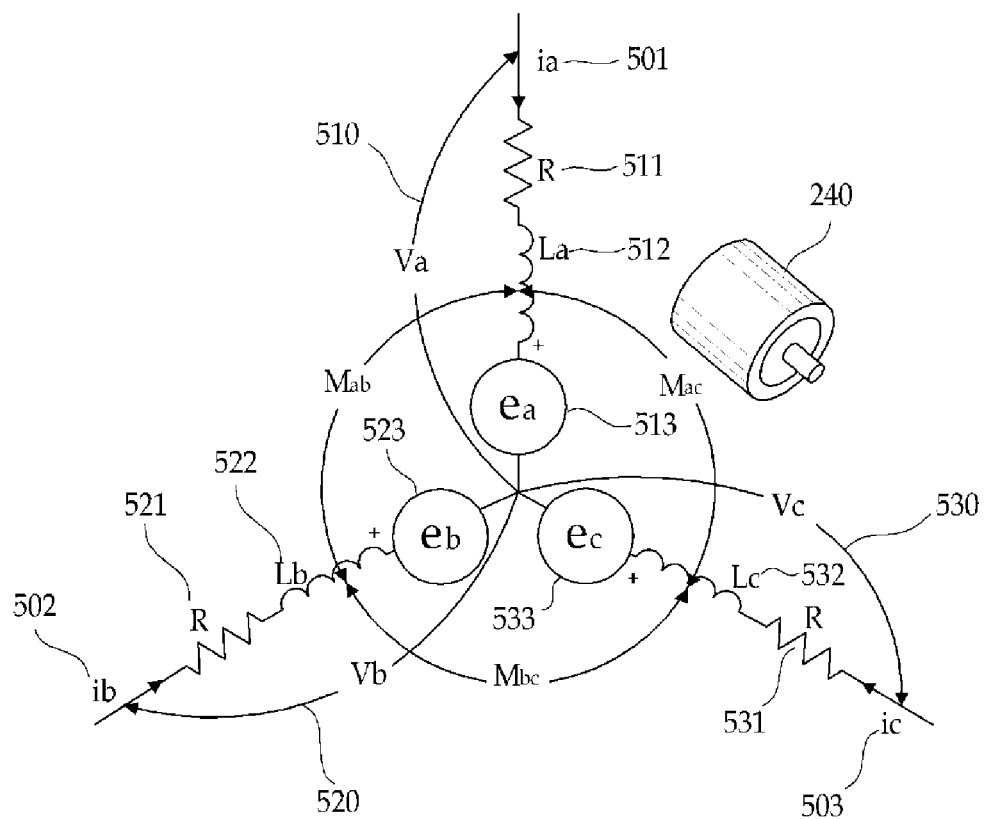
FIG. 5 is an explanation diagram illustrating an exemplary embodiment of an equivalent circuit of a general swing motor.

FIG. 5 is an explanation diagram illustrating an exemplary embodiment of an equivalent circuit of a general swing motor.

As illustrated in FIG. 5, the equivalent circuit of the swing motor 240 may be equivalized by resistance R 511, 521 and 531, inductances 512, 522 and 532, and counter electromotive components 513, 523 and 533 according to rotation of an inductance motor.

Here, the equivalent circuit of the swing motor 240 may be expressed by an equation of voltage of the motor as Equation 1 below.

$$\begin{bmatrix} V_a \\ V_b \\ V_c \end{bmatrix} = \begin{bmatrix} R & 0 & 0 \\ 0 & R & 0 \\ 0 & 0 & R \end{bmatrix} \begin{bmatrix} i_a \\ i_b \\ i_c \end{bmatrix} + \begin{bmatrix} L_s & M & M \\ M & L_s & M \\ M & M & L_s \end{bmatrix} \begin{bmatrix} i_a \\ i_b \\ i_c \end{bmatrix} \frac{d}{dt}\begin{bmatrix} i_a \\ i_b \\ i_c \end{bmatrix} + \begin{bmatrix} e_a \\ e_b \\ e_c \end{bmatrix}$$ [Equation 1]

Here, $V_a$, $V_b$ and $V_c$ refer to voltage of the swing motor 240, $i_a$, $i_b$ and $i_c$ refer to currents 501, 502 and 503 flowing the swing motor 240, R refers to resistance of the swing motor 240, $L_s$ refers to inductances 512, 522 and 532, M refers to mutual inductance, and $e_a$, $e_b$ and $e_c$ refer to the counter electromotive components 513, 523 and 533.

When it is assumed that the currents 501, 502 and 503 flowing the swing motor 240 is three-phase equilibria in Equation 1, the currents 501, 502 and 503 are expressed as Equation 2 below.

$$i_a + i_b + i_c = 0, \; M\cdot(i_a + i_b) = -M \cdot i_c$$ [Equation 2]

Here, $i_a$, $i_b$ and $i_c$ represent the currents 501, 502 and 503 flowing the swing motor 240 and M represents the mutual inductance.

The equation of the voltage of the swing motor 240 in Equation 2 is organized as Equation 3 and Equation 4 below.

$$\begin{bmatrix} V_a \\ V_b \\ V_c \end{bmatrix} = \begin{bmatrix} R & 0 & 0 \\ 0 & R & 0 \\ 0 & 0 & R \end{bmatrix} \begin{bmatrix} i_a \\ i_b \\ i_c \end{bmatrix} + \begin{bmatrix} L_s - M & 0 & 0 \\ 0 & L_s - M & 0 \\ 0 & 0 & L_s - M \end{bmatrix} \frac{d}{dt}\begin{bmatrix} i_a \\ i_b \\ i_c \end{bmatrix} + \begin{bmatrix} e_a \\ e_b \\ e_c \end{bmatrix}$$ [Equation 3]

Here, $V_a$, $V_b$ and $V_c$ represent the voltage of the swing motor 240, $i_a$, $i_b$ and $i_c$ represent the currents 501, 502 and 503 flowing the swing motor 240, R represents the resistance of the swing motor 240, $L_s$ represents the inductances 512, 522 and 532, M represents the mutual inductance, and $e_a$, $e_b$ and $e_c$ represent the counter electromotive components 513, 523 and 533.

$$\begin{pmatrix} V_a \\ V_b \\ V_c \end{pmatrix} = R\begin{pmatrix} i_a \\ i_b \\ i_c \end{pmatrix} + L\frac{d}{dt}\begin{pmatrix} i_a \\ i_b \\ i_c \end{pmatrix} + \begin{pmatrix} e_a \\ e_b \\ e_c \end{pmatrix}$$ [Equation 4]

Further, generated torque of the swing motor 240 is expressed as Equation 5 below.

$$T_e = \frac{e_a i_a + e_b i_b + e_c i_c}{\omega_m}$$ [Equation 5]

Here, $T_e$ represents the generated torque of the swing motor 240, $i_a$, $i_b$ and $i_c$ represent the currents 501, 502 and 503 flowing the swing motor 240, R represents the resistance of the swing motor 240, $L_s$ represents the inductances 512, 522 and 532, M represents the mutual inductance, $e_a$, $e_b$ and $e_c$ represent the counter electromotive components 513, 523 and 533, and $W_m$ represents a speed of the swing motor 240.

When the inverter controller 430 switches off the semiconductor switch 420 of the inverter according to the detection of the failure, such as the over-current, in the rotation of the swing motor 240 at a predetermined speed, the current of the swing motor 240 becomes "0", so that the generated torque of the swing motor 240 becomes "0" as expressed in Equation 5 and the upper swing body freely rotates until the braking operation.

When the three upper-phase switches SW1, SW2 and SW3 or the three lower-phase switches SW4, SW5 and SW6 of the semiconductor switch 420 are simultaneously switched on in the rotation of the swing motor 240 at the predetermined speed, the swing motor 240 is operated as the generator and negative (−) torque is generated, so that the swing motor 240 acquires braking force.

The braking torque is calculated according to a differential equation of Equation 6.

$$0 = R\begin{pmatrix} i_a \\ i_b \\ i_c \end{pmatrix} + L\frac{d}{dt}\begin{pmatrix} i_a \\ i_b \\ i_c \end{pmatrix} + \begin{pmatrix} e_a \\ e_b \\ e_c \end{pmatrix}$$ [Equation 6]

Here, $i_a$, $i_b$ and $i_c$ represent the currents 501, 502 and 503 flowing the swing motor 240, $e_a$, $e_b$ and $e_c$ represent the counter electromotive components 513, 523 and 533, R represents the resistance of the swing motor 240, and $L_s$ represents the inductance.

The current in a normal state is calculated according to Equation 7 below. In this case, the current has the counter electromotive and a phase difference by the resistance and the inductance of the swing motor 240 as expressed in Equation 7.

$$\begin{pmatrix} i_a \\ i_b \\ i_c \end{pmatrix} = \frac{1}{Z}\begin{pmatrix} e_a \cdot e^{\theta t} \\ e_b \cdot e^{\theta t} \\ e_c \cdot e^{\theta t} \end{pmatrix}$$ [Equation 7]

Here, $i_a$, $i_b$ and $i_c$ represent the currents 501, 502 and 503 flowing the swing motor 240, $e_a$, $e_b$ and $e_c$ represent the counter electromotive components 513, 523 and 533, Z represents impedance of the swing motor 240, and θ represents the phase difference.

When the phase difference is referred to as "θ", the impedance and the phase difference of the swing motor 240 are calculated as Equation 8 and Equation 9.

$$Z = \sqrt{R_a^2 + (\omega_e l)^2}$$ [Equation 8]

Here, Z represents impedance of the swing motor 240, $R_a$ represents the resistance 511 of the swing motor 240, and L represents the inductance of the swing motor 240.

$$\sin\theta = \frac{R_a}{\sqrt{R_a^2 + (\omega_e l)^2}}$$ [Equation 9]

Here, θ represents the phase difference and $R_a$ represents the resistance 511 of the swing motor 240.

The braking torque of the swing motor 240 is represented by Equation 10 below.

$$T_e = \frac{e_a i_a \sin\theta + e_b i_b \sin\theta + e_c i_c \sin\theta}{\omega_m}$$ [Equation 10]

Here, $T_e$ represents the generated torque of the swing motor 240, $i_a$, $i_b$ and $i_c$ represent the currents 501, 502 and 503 flowing the swing motor 240, $e_a$, $e_b$ and $e_c$ represent the counter electromotive components 513, 523 and 533, θ represents the phase difference, and $W_m$ represents the speed of the swing motor 240.

The actual resistance of the swing motor 240 has a very small value compared to the inductance, thereby failing to sufficiently obtain the braking torque.

Figure 6:
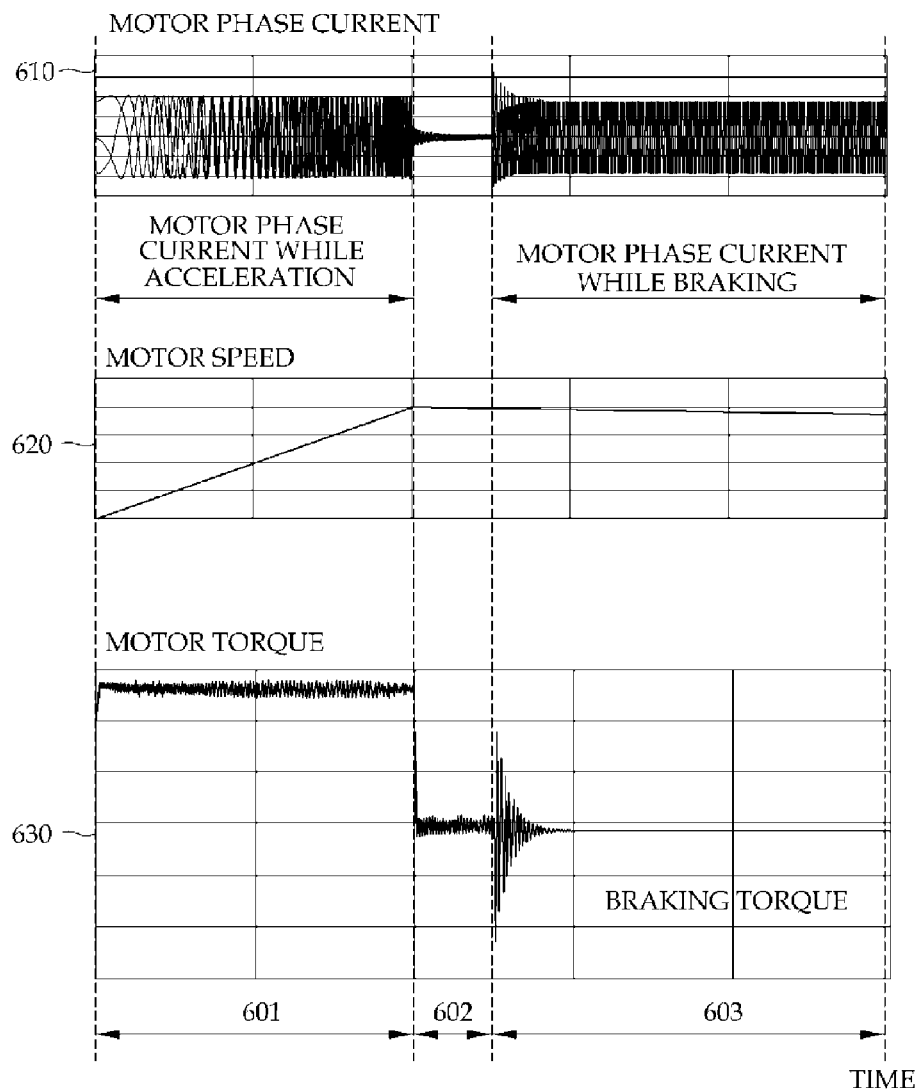

FIG. 6 is an example diagram illustrating an exemplary embodiment of braking torque when three lower-phase switches of an inverter are switched on.

FIG. 6 represents motor phase current 610 of the swing motor 240, a speed 620 of the swing motor 240 and torque 630 of the swing motor 240 according to a state of the swing motor 240.

When a state of the swing motor 240 is an acceleration state 601, a cycle of the motor phase current 610 becomes short, the motor speed 620 of the swing motor 240 is increased to a predetermined speed, and the torque 630 of the swing motor 240 has a specific value.

When the state of the swing motor 240 is a braking state 603 after a normal state 602, the braking torque of the swing motor 240 is generated when the three lower-phase switches of the inverter are switched on upon the rotation of the swing motor 240 at a predetermined speed. The braking torque has a small value of $\frac{1}{30}^{th}$ of rated torque of the swing motor 240.

The current of the swing motor 240 is the three-phase equilibria, so that a V-phase current and a W-phase current becomes in a state of flowing into the swing motor 240 based on a time in which a U-phase current flows from the swing motor 240.

Figure 7A:
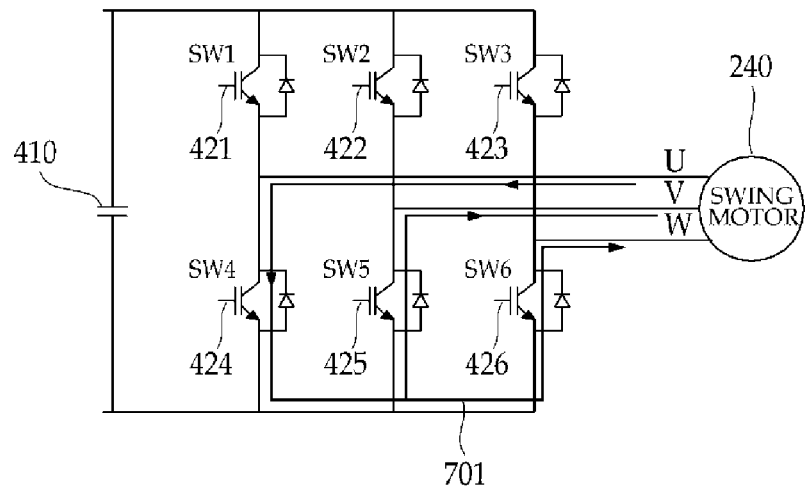
FIGS. 7A and 7B are explanation diagrams illustrating an exemplary embodiment of current of an inverter for driving a swing motor when switches are switched on/off.
Figure 7B:
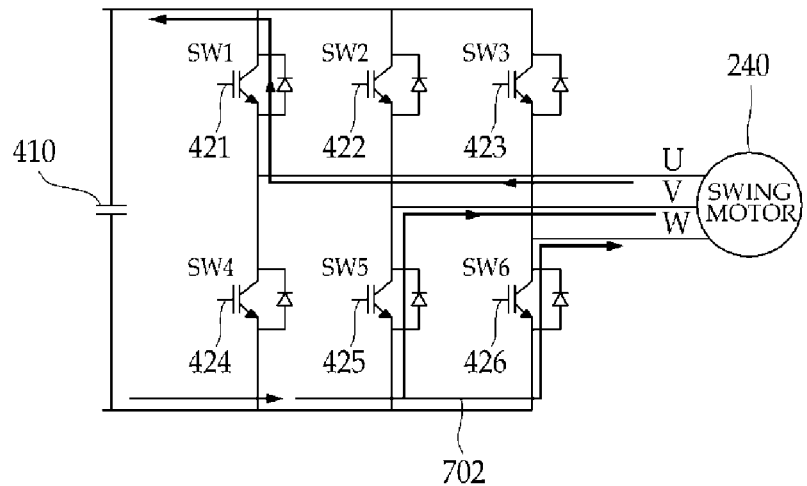

FIGS. 7A and 7B are explanation diagrams illustrating an exemplary embodiment of the current of the inverter for driving the swing motor when the switches are switched on/off.

As illustrated in FIG. 7A, current 701 when the lower-phase switches SW4, SW5 and SW6 424 to 426 of the inverter are switched on flows through diodes of SW4 424, SW5 425 and SW6 426 of the inverter. In this case, when the lower-phase switches SW4, SW5 and SW6 424 to 426 are switched off, the current 701 flowing into the switch SW4 424 does not flow anymore.

As illustrated in FIG. 7B, current 702 flows to the capacitor 410 of the DC terminal through the diode of the switch SW1 421. The current 702 flowing to the capacitor 410 of the DC terminal charges the capacitor 410 of the DC terminal.

The braking torque may be calculated with a quantity of energy charged to the capacitor 410 of the DC terminal and the number of rotation of the swing motor 240 as represented in Equation 11.

$$T_e = \frac{\text{Energy charged to capacitor}}{W_m}$$ [Equation 11]

$T_e$ represents the braking torque of the swing motor 240 and $W_m$ represents a speed of the swing motor 240.

Since the quantity of energy charged to the capacitor 410 varies with the voltage of the capacitor 410, the braking torque of the swing motor 240 is the function of the voltage of the DC terminal and the number of rotation of the swing motor 240.

Figure 8:
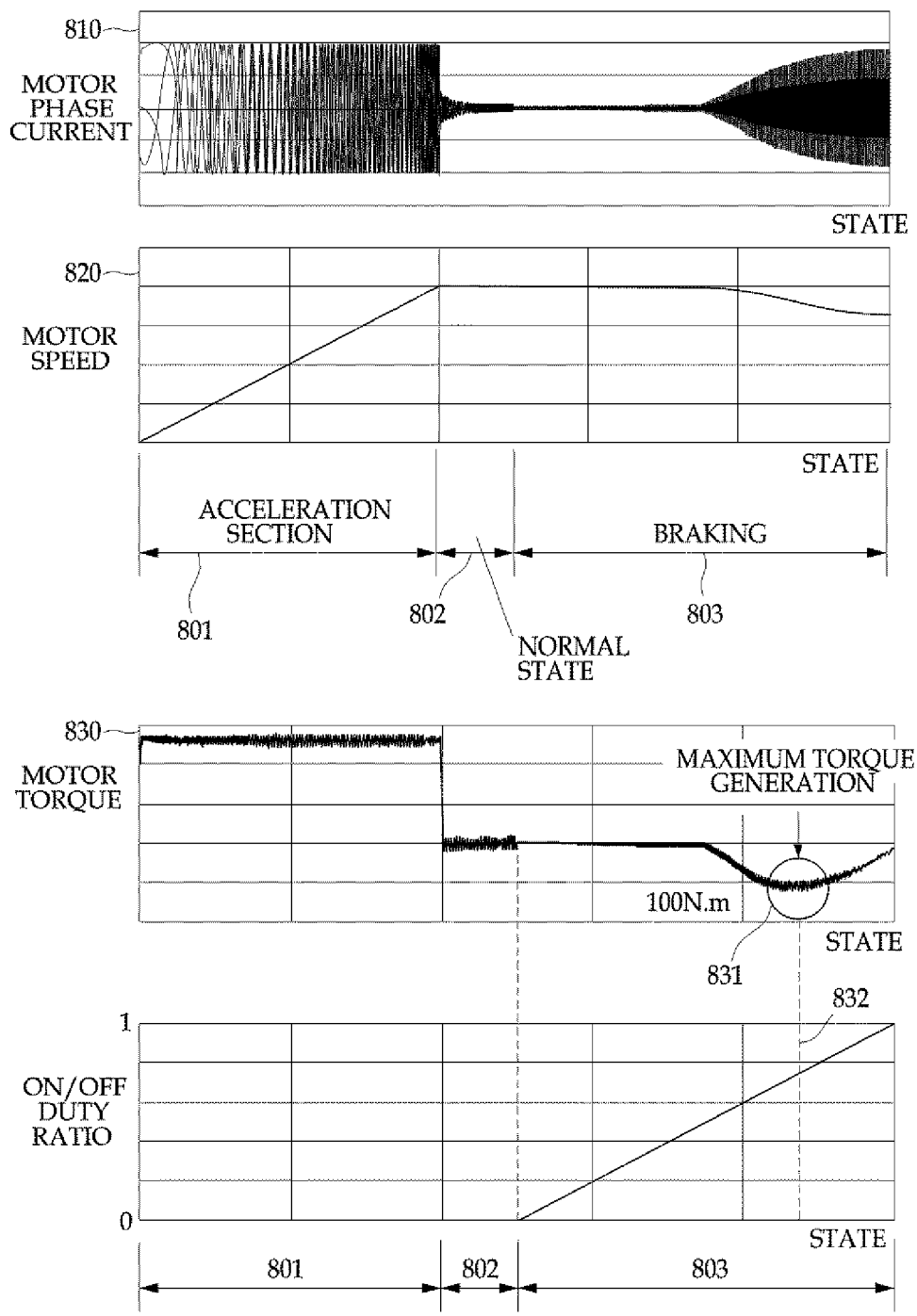
FIG. 8 is an explanation diagram illustrating an exemplary embodiment of braking torque according to a change in an on/off duty ratio of an inverter according to the present disclosure.

FIG. 8 is an explanation diagram illustrating an exemplary embodiment of braking torque according to a change in an on/off duty ratio of an inverter according to the present disclosure.

As illustrated in FIG. 8, motor phase current 810 of the swing motor 240, a speed 820 of the swing motor 240 and torque 830 of the swing motor 240 according to a state of the swing motor 240 are represented.

Particularly, FIG. 8 illustrates a result of a change in the braking torque 830 of the swing motor 240 measured in a condition where after the swing motor 240 rotates at a predetermined speed, the upper-phase switches SW1, SW2 and SW3 421 to 423 of the inverter are switched off and the on/off duty ratio of the lower-phase switches SW4, SW5 and SW6 424 to 426 of the inverter is changed.

As illustrated in FIG. 8, when the duty ratio is "0", the three lower-phase switches SW4, SW5 and SW6 424 to 426 are all in a state of being switched off. However, when the duty ratio is "1", the three lower-phase switches SW4, SW5 and SW6 424 to 426 are all in a state of being switched on. Here, in braking the swing motor 240, the braking torque has a negative (−) torque value, and the maximum torque 831 is generated at a specific duty 832.

Accordingly, when the speed 820 of the swing motor 240 is determined and the DC link voltage of the inverter is determined, the duty 832 at which the maximum braking torque is generated is determined by the speed 820 of the swing motor 240 and the DC voltage. That is, the duty 832 at which the maximum braking torque is generated is in inverse proportion to the DC voltage and is in proportion to the speed of the swing motor 240.

Figure 9:
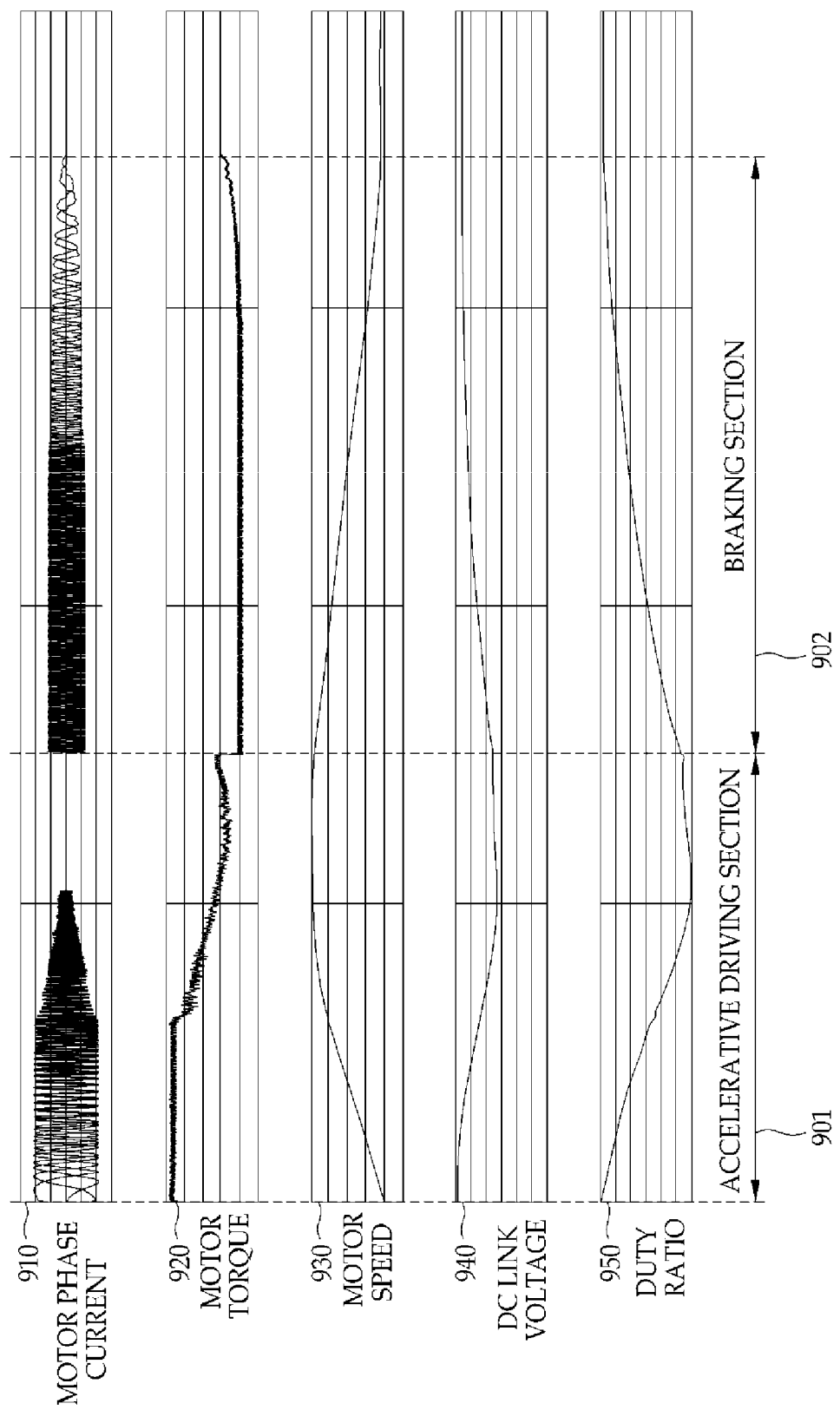
FIG. 9 is an explanation diagram illustrating an exemplary embodiment of braking torque of a motor according to a change in a duty ratio according to the present disclosure.

FIG. 9 is an explanation diagram illustrating an exemplary embodiment of the braking torque of the motor according to a change in a duty ratio.

FIG. 9 illustrates braking torque 920 of the swing motor 240 when the duty ratio is changed according to a motor speed 930 of the swing motor 240 and DC link voltage 940 of the inverter in order to maximally generate the braking torque of the swing motor 240.

Accordingly, when the operation of the inverter is stopped due to the over-current of the inverter, and the like, the inverter controller 430 changes a duty ratio 950 according to a motor rotation speed 930 of the swing motor 240 and DC link voltage 940 of the inverter. Then, the inverter controller 430 generates the maximum braking torque of the swing motor 240 by simultaneously switching on/off the three lower-phase switches or the three upper-phase switches of the inverter according to the changed duty ratio 950, thereby rapidly stopping the upper swing body.

Figure 10:
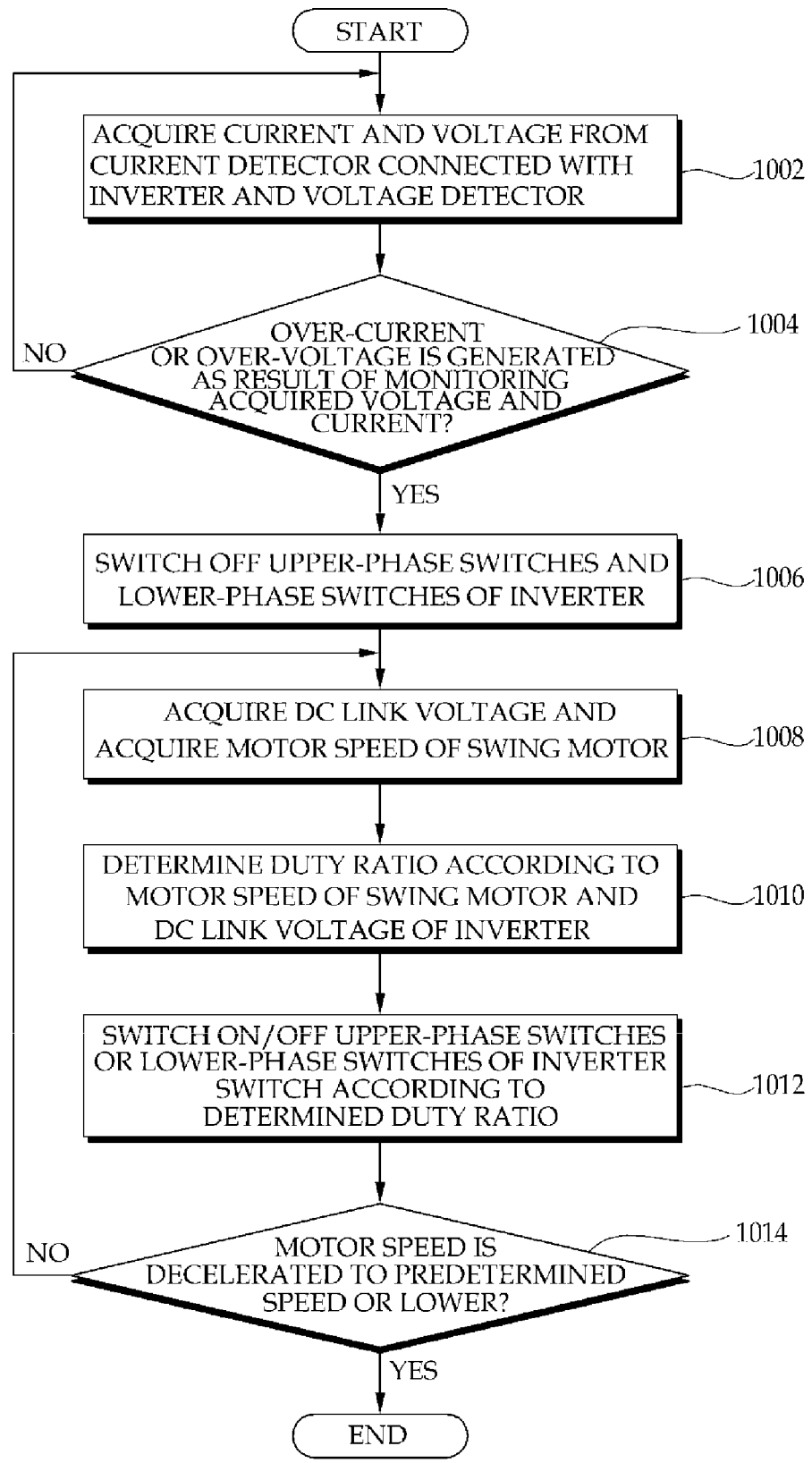
FIG. 10 is a flowchart illustrating an exemplary embodiment of a method of controlling an inverter for driving a swing motor according to the present disclosure.

FIG. 10 is a flowchart illustrating an exemplary embodiment of a method of controlling the inverter for driving the swing motor according to the present disclosure.

The inverter controller 430 acquires current and voltage from the current detector 261 for detecting current and the voltage detector 262 for detecting voltage (1002).

Then, the inverter controller 430 monitors the voltage and the current detected from the current detector 261 and the voltage detector 262, to check whether failure caused by the over-current or the over-voltage is generated (1004).

As a result of the check (1004), when the failure caused by the over-current or the over-voltage is generated, the inverter controller 430 switches off the switch 420 of the inverter according to the detection of the failure, such as the over-current and the over-voltage (1006). However, as the result of the check (1004), when the failure caused by the over-current or the over-voltage is not generated, the inverter controller 430 begins from the process "1002" again.

Subsequently, the inverter controller 430 acquires DC link voltage from the voltage detector 262 and acquires the motor speed of the swing motor 240 (1008).

Then, the inverter controller 430 determines the duty ratio 950 according to the motor speed 930 of the swing motor 240 and the DC link voltage 940 of the inverter (1010).

Further, the inverter controller 430 generates braking torque of the swing motor 240 by switching on/off the upper-phase switches SW1, SW2 and SW3 421 to 423 or the lower-phase switches SW4, SW5 and SW6 424 to 426 of the inverter switch 420 according to the duty ratio 950 determined in the process "1010" (1012).

Then, the inverter controller 430 checks whether the motor speed is decelerated to a predetermined speed or lower (1014). Here, the predetermined speed means a speed at which the swing motor 240 may stop by a separately provided mechanical brake without failure.

As a result of the check (1014), when the motor speed is decelerated to the predetermined speed or lower, the inverter controller 430 completes the process of the switching on/off of the upper-phase switches SW1, SW2 and SW3 421 to 423 or the lower-phase switches SW4, SW5 and SW6 424 to 426 of the inverter switch 420. However, when the motor speed is not decelerated to the predetermined speed or lower, the inverter controller 430 begins from the process "1008" of acquiring the motor speed 930 of the swing motor 240 and the DC link voltage 940 changed by the braking torque again.

Although an exemplary embodiment of the present disclosure has been described for illustrative purposes, the present disclosure may be variously modified by those skilled in the art to which the present disclosure pertains without departing from the spirit of the present disclosure. Therefore, the exemplary embodiments disclosed in the present disclosure are intended to limit the present disclosure. The scope of the present disclosure shall be construed on the basis of the accompanying claims and it shall be construed that all of the technical technologies included within the scope equivalent to the claims belong to the scope of the present disclosure.

The method of controlling the inverter for driving the swing motor according to the present disclosure prevents failure of the inverter caused by over-current or over-voltage and rapidly stops the upper swing body in a hybrid excavator to which the swing motor for driving the upper swing body is applied, thereby making it possible to prevent the risk of accidents.

Although the present disclosure has been described with reference to exemplary and preferred embodiments, workers skilled in the art will recognize that changes may be made in form and detail without departing from the spirit and scope of the disclosure.

The invention claimed is:

1. A method of controlling an inverter for driving a swing motor so as to swing an upper body of a hybrid excavator, the method comprising:
    confirming whether failure caused by over-current and over-voltage is generated in the inverter for driving the swing motor;
    when the failure of the inverter for driving the swing motor is confirmed, switching off an upper-phase switch or a lower-phase switch of the inverter for driving the swing motor;
    detecting a DC link voltage connected with the inverter for driving the swing motor and a motor speed of the swing motor;
    calculating an on/off duty ratio of the upper-phase switch or the lower-phase switch at which maximum braking torque is generated using the detected DC link voltage and the detected motor speed;
    switching on/off the upper-phase switch or the lower-phase switch of the inverter for driving the swing motor according to the calculated on/off duty ratio so as to generate braking torque of the swing motor;

generating the braking torque in the swing motor to rapidly stop the upper body of the hybrid excavator;

checking whether the motor speed is decelerated to a predetermined speed or lower, wherein the predetermined speed is a speed at which the swing motor may stop by a separately provided mechanical brake without failure;

wherein when the DC link voltage and the motor speed are changed by the braking torque after the switching, further comprising renewing the calculated on/off duty ratio according to the changed DC link voltage and motor speed, wherein the switching comprises switching on/off the upper-phase switch or the lower-phase switch according to the renewed on/off duty ratio; and wherein the on/off duty ratio is in proportion to the detected DC link voltage and is in inverse proportion to the detected motor speed.

2. The method of claim 1, wherein the switching comprises switching off the upper-phase switch and switching on/off the lower-phase switch according to the calculated on/off duty ratio, or switching off the lower-phase switch and switching on/off the upper-phase switch according to the calculated on/off duty ratio.

3. The method of claim 1, wherein the switching on/off the upper-phase switch or the lower-phase switch of the inverter for driving the swing motor comprises simultaneously switching on/off lower-phase switches or upper-phase switches of the inverter.

* * * * *